ര
3,329,709
N,N' - BIS - [2 - (3',4' - DIHYDROXYPHENYL)-2-HY-
DROXYETHYL] - HEXAMETHYLENE - DIAMINE
AND SALTS THEREOF
Otto Schmid, Leonding, near Linz, and Heimo Stormann-
Menninger Lerchenthal, Gerhard Zolss, Richard Gratz,
and Karl Wismayr, Linz, Austria, assignors to Oster-
reichische Stickstoffwerke Aktiengesellschaft, Linz,
Austria
No Drawing. Filed June 5, 1964, Ser. No. 373,051
Claims priority, application Austria, June 11, 1963,
A 4,678/63
3 Claims. (Cl. 260—570.6)

The present invention relates to bisalkanolamine derivatives having the formula:

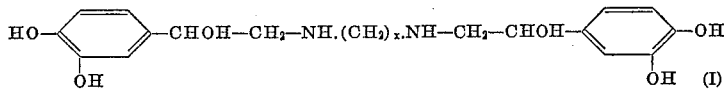

in which $x$ is an integer form 4 to 12, and salts of these derivatives with non-toxic acids.

The compounds of this invention have a positive inotropic and chronotropic effect on the heart and also a broncholytic action, such properties corresponding qualitatively to the known 1-(3,4 - dioxyphenyl) - 2 - isopropyl aminoethanol-(1), but which differ therefrom quantitatively in that their action is actually somewhat weaker, but more lasting. This is particularly the case with the compounds of Formula I which have a short chain. For instance, experiments performed in the Rössler-Konzett bronchial spasm test (Arch. exper. Path. Pharmacol. 195, 71 (1940) using N,N'-bis-2-(3',4' - dihydroxyphenyl) - 2-hydroxyethyl - hexamethylene - diamine - dichlorohydrate having a toxicity of 38.5 mg./kg. revealed an action which was approximately half as strong as 1-(3,4-dioxyphenyl)-2-isopropyl-amino-ethanol-(1), but which lasted longer since it takes about a quarter of an hour, until the bronchial spasms caused by acetyl choline could be started again completely. Moreover, a dose of 10γ/kg. administered to a narcotized dog produced an increase in heart beat of approximately 75% of the initial value, the increase dropping only after 4 hours to approximately half the maximum increase, while 5γ/kg. of 1-(3,4-dioxyphenyl)-2-isopropyl - amino - ethanol - (1) approximately doubled the heart beat which dropped to half the maximum increase however, within two minutes.

The lasting action of the compounds of Formula I therefore makes them particularly suitable for combating certain disturbances of the heart beat and for treating spastic conditions of the air passages.

Because of their properties of resorption the compounds of Formula I can also be administered orally, which is a great advantage.

The invention also provides a process for preparing a compound having Formula I which comprises reducing a bis-alkanone amine derivative having the formula:

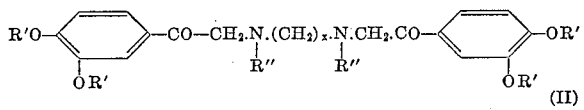

in which R' and R" are the same or different and are each a hydrogen atom or a benzyl group and $x$ has the meaning defined above, to the bisalkanol and splitting off any benzyl groups still present by hydrogenolysis.

The reduction can be performed by any of the methods conventionally used for the preparation of phenyl alkanolamines. Catalytic hydrogenation has proved most useful, the most favourable results being obtained using palladium-carbon as the catalyst. Low molecular weight aliphatic alcohols, such as methanol, if necessary mixed with water, are recommended as solvents for the hydrogenation.

If necessary, the phenolic OH groups and the two secondary amino groups can conveniently be protected by means of the benzyl group which is in many cases split off simultaneously with the hydrogenation of the alkanone to the alkanol. When this does not happen, the benzyl groups are removed by a further hydrogenation.

The compounds of Formula I obtained in this manner can be converted in any conventional manner into salts which are the preferred pharmaceutical form of application. Salts of this kind, which are derived from non-toxic acids, are, for instance, the bromides, chlorides, sulphates, cyclohexyl sulphamates or tartrates. The compounds can be administered, for instance, in drops, injection solutions, tablets or coated pills.

Since the compounds of the general Formula I have two identical optically active carbon atoms there exists a racemic form and a mesoform. The racemate can be separated into the optically opposite form in a conventional manner, for instance, via the salts of optically active acids.

The compounds of Formula II used as the starting material can be prepared by reacting 2 moles of 3,4-dioxy-ω-chloroacetophenone, which if necessary can have both OH groups protected with a polymethylene diamine in which a hydrogen atom is protected by an easily splittable radical in each of the amino groups. The resulting hydrogen halide is captured by one mole of polymethylene diamine present in excess.

The following examples illustrate the invention.

EXAMPLE 1

1.8 g. of N,N'-bis-2-(3',4'-dihydroxyphenyl) - 2 - oxoethyl-tetramethylenediamine-dichlorohydrate were hydrogenated, by means of 0.6 g. of 10% palladium-carbon at 42° C. with hydrogen at normal pressure in a mixture of 100 cc. of methanol and 20 cc. of water. The compound dissolved completely only during the hydrogenation. The theoretically expected quantity of hydrogen was absorbed after 3 hours and the hydrogenation came to a stop. The palladium-carbon was removed by suction, the solution was concentrated and the residue was crystallized with absolute ether. After removal of the catalyst the product was washed with absolute ether. The result was 1.5 g. N,N'-bis-[2-(3',4'-dihydroxy-phenyl) - 2 - hydroxyethyl]-tetramethylenediamine-dichlorohydrate having a melting point of 187° to 188° C. and corresponding to 82.5% of the theoretical value.

The N,N'-bis-[2-(3',4'-dihydroxyphenyl)-2 - oxoethyl]-tetramethylenediamine-dichlorohydrate used as the starting material was prepared as follows:

The corresponding N,N'-dibenzyl compound was first prepared by the prolonged boiling (10 hours) of 2 moles of chloraceto pyrocatechin with 2 moles of N,N'-dibenzyl tetramethylene diamine in boiling acetone, approximately the theoretical quantity of N,N'-benzyl tetramethylene diamine being precipitated and separated from the acetone solution in the form of dichlorohydrate. The acetone solution contained the required N,N'-dibenzyl-N,N'-bis-[2-(3',4'-dihydroxyphenyl)-2 - oxoethyl] - tetramethylene diamine. The benzyl radicals were then dehydrated from the crude product in a chloride methanol solution with a pH of approximately 1, the N,N'-bis-[2-(3',4'-dihydroxyphenyl)-2-oxoethyl]-tetramethylene diamine - dichlorohydrate being precipitated in more than 50% yield on the catalyst (10% palladium-carbon) and purified by boiling out with water and crystallization in cold conditions. The substance was dried at 80° C. in vacuo. Melting point: from 245° C. onwards decomposition.

In a similar maner N,N'-bis-[2-(3',4'-dihydroxyphenyl)-2-hydroxyethyl]-octamethylene diamine dichlorohydrate (melting point 211° to 212° C.) was obtained by the hydrogen action of N,N'-bis-[2-(3',4',-dihydroxyphenyl)-2-oxoethyl)-octamethylene diamine - dichlorohydrate. In a similar manner N,N'-bis-[2-(3',4',-dihydroxyphenyl)-2-hydroxyethyl]-decamethylenediamine - dichlorohydrate (melting point 183–184° C.) was obtained by the hydrogenation of N,N'-bis-[2-(3',4'-dihydroxyphenyl)-2-oxoethyl]-decamethylenediamine-dichlorohydrate.

EXAMPLE 2

5 g. of N,N'-dibenzyl-N,N'-bis-[2-(3',4'-dihydroxyphenyl)-2-oxoethyl]-hexamethylenediamine - dichlorohydrate as a monohydrate were hydrogenated under considerable agitation, by means of 2.0 g. of 10% palladium-carbon, with hydrogen in a mixture of 270 cc. of methanol and 50 cc. of water at 45° C. and normal pressure. After about 4 hours the theoretical quantity of hydrogen (4 moles of hydrogen per 1 mole of substance) was absorbed for the splitting off of the two benzyl radicals and the reduction of the two carbonyl groups to carbinol groups, and the hydrogenation came to a stop. After separation of the catalyst the product was concentrated until dry, the residue was triturated with acetone, the resulting crystallizate was removed by suction and washed with acetone. The yield of N,N'-bis-[2-(3',4'-dihydroxyphenyl) - 2 - hydroxyethyl] - hexamethylene-diamine-dichlorohydate was 3.3 g.—i.e., 92% of the theoretical value. A quantity of 2.8 g. having a melting point of 197.5° to 198° C. was obtained by precipitation from a mixture of methanol-ether.

The N,N'-dibenzyl-N,N' - bis-[2-(3',4'-dihydroxyphenyl)-2-oxoethyl]-hexamethylene diamine-dichlorohydrate-monohydrate used as the starting material was prepared as follows:

2 moles of chloroaceto pyrocatechin were dissolved in 2,000 cc. of acetone and heated to boiling with 2 moles of N,N'-dibenzylhexamethylene-diamine for 12 hours, almost the theoretical quantity of N,N'-dibenzylhexamethylene-diamine-dichlorohydrate being precipitated and removed by suction after cooling. 1.5 times the quantity by volume of hydrochloric and acid 1:1 was added to the filtrate, approximately 66% of the theoretically possible quantity of crude dichlorohydrate of the N,N'-dibenzyl-N,N'-bis-[2-(3',4'-dihydroxyphenyl) - 2 - oxoethyl]-hexamethylene-diamine being precipitated. The product was cleaned by recrystallization from water with the addition of animal charcoal. After drying the substance contained water of crystallization at ambient temperature. Melting point 206° to 209.5° C.

N,N'-bis-[2 - (3',4'-dihydroxyphenyl)-2-hydroxyethyl]-hexamethylene-diamine-dibromohydrate (melting point 183° to 185° C.) is obtained in a similar manner.

Free N,N'-bis-[2-(3',4' - dihydroxyphenyl)-2-hydroxyethyl]-hexamethylene-diamine can be separated from these salts by the addition of the equivalent quantity of caustic alkali solution. It has a melting point of 162° to 165° C. and contains half a mole of water of crystallization.

N,N'-bis-[2-(3',4' - dihydroxyphenyl)-2 - hydroxyethyl]-hexamethylene-diamine-sulphate (melting point 222° to 228° C.) can be obtained by reacting the base with the equivalent quantity of sulphuric acid in an alcohol solution, followed by concentration and precipitation from water-alcohol solution.

EXAMPLE 3

3 g. of N'N'-bis-[2-(3',4'-dihydroxyphenyl)-2-oxoethyl]-dodecamethylene-diamine-dichlorohydrate were hydrogenated, by means of 1.5 g. of 10% palladium-carbon in 140 cc. of methanol, with hydrogen at normal pressure until hydrogen absorption terminated. After the removal of the palladium-carbon the filtrate was concentrated until dry and triturated with absolute ether. The yield of N,N'-bis-[2-(3',4' - dihydroxyphenyl)-2-hydroxyethyl]-dodecamethylene-diamine-dichlorohydrate was 2.6 g., i.e. 86% of the theoretical value. Melting point 142° to 144.5° C. When precipitated from ethanol-acetone the melting point of the analytically pure product rises to 146° to 147.5° C.

The N,N'-bis-[2-(3',4'-dihydroxyphenyl)-2-oxoethyl]-dodecamethylene-diamine-dichlorohydrate used as starting material was prepared in a manner similar to that described in Example 1. It has a melting point of 216° to 220° C. (decomposition).

N,N'-bis - [2-(3',4'-dihydroxyphenyl)-2-hydroxyethyl]-heptamethylene-diamine-dichlorohydrate was obtained in the form of an amorphous powder by hydrogenating N,N'-bis-[2-(3',4'-dihydroxyphenyl) - 2-oxoethyl] - heptamethylene-diamine-dichlorohydrate (melting point 238° C.).

N'N'-bis-[2-(3',4' - dihydroxyphenyl)-2-hydroxyethyl]-pentamethylene-diamine-dichlorohydrate was obtained in the form of an amorphous powder by hydrogenating N,N' - bis-[2-(3',4'-dihydroxyphenyl) - 2-oxoethyl] - pentamethylene-diamine-dichlorohydrate (melting point 250° C.).

We claim:

1. The salts with non-toxic acids of N,N'-bis[2-(3',4'-dihydroxyphenyl)-2-hydroxyethyl] - hexamethylene - diamine.

2. N,N'-bis-[2-(3',4'-dihydroxyphenyl) - 2-hydroxyethyl]-hexamethylenediamine-dichlorohydrate.

3. N,N' - bis-[2-(3',4'-dihydroxyphenyl)-2-hydroxyethyl]-hexamethylenediamine-dibromohydrate.

References Cited

UNITED STATES PATENTS 2,653,977  9/1953  Craig et al. _____ 260—570.5

OTHER REFERENCES

Niederl et al., "Journal Organic Chemistry," vol. 14 pp. 27–30 (1951).

Burger, "Medicinal Chemistry," 2nd edition, p. 597 (1960).

CHARLES B. PARKER, *Primary Examiner.*

ROBERT V. HINES, *Assistant Examiner.*